United States Patent
Mantell et al.

(10) Patent No.: US 6,411,399 B1
(45) Date of Patent: Jun. 25, 2002

(54) SYSTEM FOR RESOLUTION ENHANCEMENT, SUCH AS IN A MULTI-PASS INK-JET PRINTER

(75) Inventors: David A. Mantell, Rochester; James B. Kuwik, Fairport, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/336,812

(22) Filed: Jun. 21, 1999

(51) Int. Cl.[7] .................................................. G06F 13/00
(52) U.S. Cl. ........................ 358/1.2; 358/1.9; 358/447; 358/517; 358/518
(58) Field of Search .................... 358/1.2, 1.9, 1.13, 358/515, 516, 517, 518, 521, 529, 447–448, 452, 453

(56) References Cited

U.S. PATENT DOCUMENTS 6,129,457 A * 10/2000 Thompson et al. .......... 358/1.2

* cited by examiner

*Primary Examiner*—Mark Wallerson
(74) *Attorney, Agent, or Firm*—R. Hutter

(57) ABSTRACT

In a digital printing apparatus such as an ink-jet printer, a resolution enhancement technique is used to increase the output resolution. Each print-black pixel in the original image is assigned to a set of subpixels in the output image data, and the position of spot placement is rotated among subpixel positions for a series of print-black pixels along a scan line.

7 Claims, 3 Drawing Sheets

SYSTEM FOR RESOLUTION ENHANCEMENT, SUCH AS IN A MULTI-PASS INK-JET PRINTER

FIELD OF THE INVENTION

The present invention relates to a system, particularly suitable for use in ink-jet printing apparatus, wherein image data of an original resolution is output by the printing apparatus at an enhanced resolution higher than the original resolution.

BACKGROUND OF THE INVENTION

In digital printing of images based on original image data, the overall performance of the printing system is constrained by a number of factors. Among these factors are the processing speed by which image data is caused to activate the printing hardware, the desired resolution of the output image, and the applicability of image-enhancement techniques such as the use of error diffusion to simulate grayscale or halftone images. Outputting an image at a higher resolution is generally always desirable, but processing of enhanced image data consumes processing time, and image-enhancement techniques, such as error diffusion to simulate halftones and grayscales, may not always be compatible with resolution enhancement techniques.

Ink-jet printing, whether based on thermal ink jet technology or piezoelectric or acoustic ink jet technology, is well known. As shown in FIG. 1, regardless of the basic ink ejection technology, a typical arrangement of an ink-jet printer includes a printhead PH of relatively small dimensions which moves in a fast scan direction FS across a sheet S, thus forming a band B of printed area as the ejectors in the printhead propel ink onto the sheet S. Because of the relatively small size of printhead PH, the width of any band B will be small relative to the sheet S, and thus, as is known in the art, it is common to have sheet S be indexed in the index direction as shown, so that a series of swaths formed by a succession of bands B make every portion of a sheet S available to the printhead PH.

One generally-known technique for improving the overall image quality of an ink-jet apparatus, whether monochrome or color, is to permit the printhead PH to print on any particular area on sheet S multiple times during the printing process. One simple way in which this can be accomplished is to have a "two-pass" system, wherein, for each band B, the printhead PH moves first in one direction along fast scan direction FS, and then returns in the opposite direction along the fast scan direction FS before the paper is indexed to print the next band. In this way, the printhead PH gets two opportunities for printing in the area of a particular band B. Systems which permit more than two passes of the printhead over any particular area, such as a four-pass system, can readily be contemplated.

Another technique for improving the overall image quality, particularly in ink-jet printing apparatus, is to increase the ejection rate of the printhead as it moves relative to the sheet, thereby increasing the output resolution of the system at least along the fast scan direction FS. Typical in the marketplace are inexpensive ink-jet printing apparatus with double resolution along with fast scan direction, such as an output resolution of 600×1200 spi, which operate in this way. (With ink-jet printing apparatus, to increase the output resolution in the other dimension would either require replacement of the printhead with a printhead with more ejectors per unit length or making advances of the media include movements that are not integral multiples of the ejector spacing.)

The present invention is directed to a method of operating a digital printer which improves the performance of the system, particularly in regard to the techniques of multiple-pass printing and resolution enhancement.

SUMMARY OF THE INVENTION

According to one aspect of the present invention, there is provided a method of printing digital image data with a digital printer. The image data has print-black and print-white pixels arranged in an original resolution, and the digital printer is capable of outputting an output image having an output resolution that is higher in at least one dimension than the original resolution. For each pixel in the image data, the pixel is associated with a set of subpixel areas, the subpixel areas for each pixel being arranged in positions to reflect a relationship of the original resolution to the output resolution. For each print-black pixel in the image data, a print-black datum is assigned to a subpixel area. The locations of print-black data among subpixel areas are distributed whereby, for a set of print-black pixels, the positions of the print-black data are substantially evenly distributed among positions of subpixel areas.

DETAILED DESCRIPTION OF THE INVENTION

Figure 2:
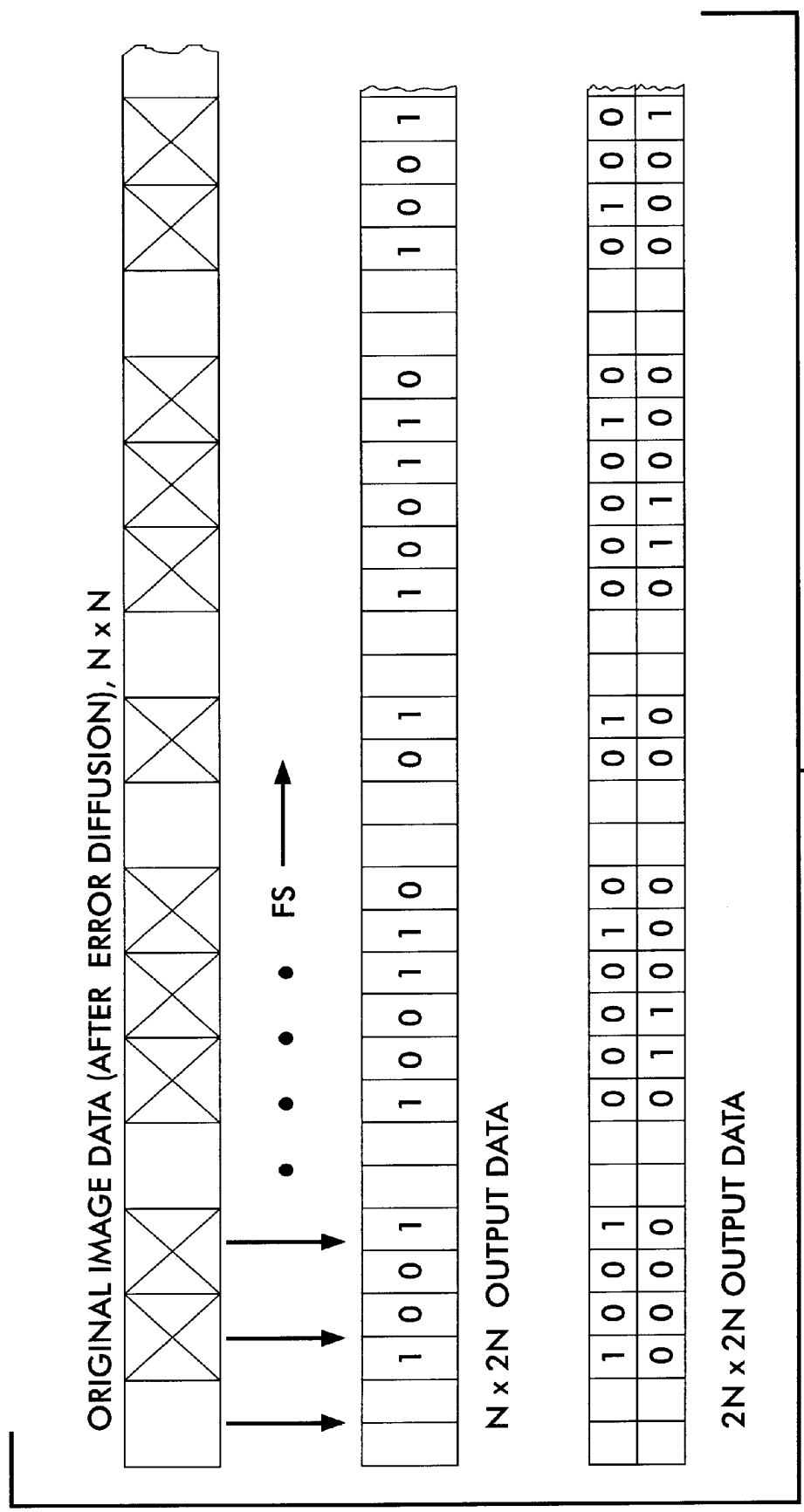
FIG. 2 is a diagram showing how original image data in a single line of pixels in original image data can be rendered in various ways in a resolution enhanced manner, according to the present invention.

FIG. 2 is a set of comparative diagrams showing, as labeled, a line of pixel data as would appear in original image data, and, in positions underneath the pixels of the original image data, diagrams showing spot placement according to the present invention, as applied to different printing techniques.

Figure 1:
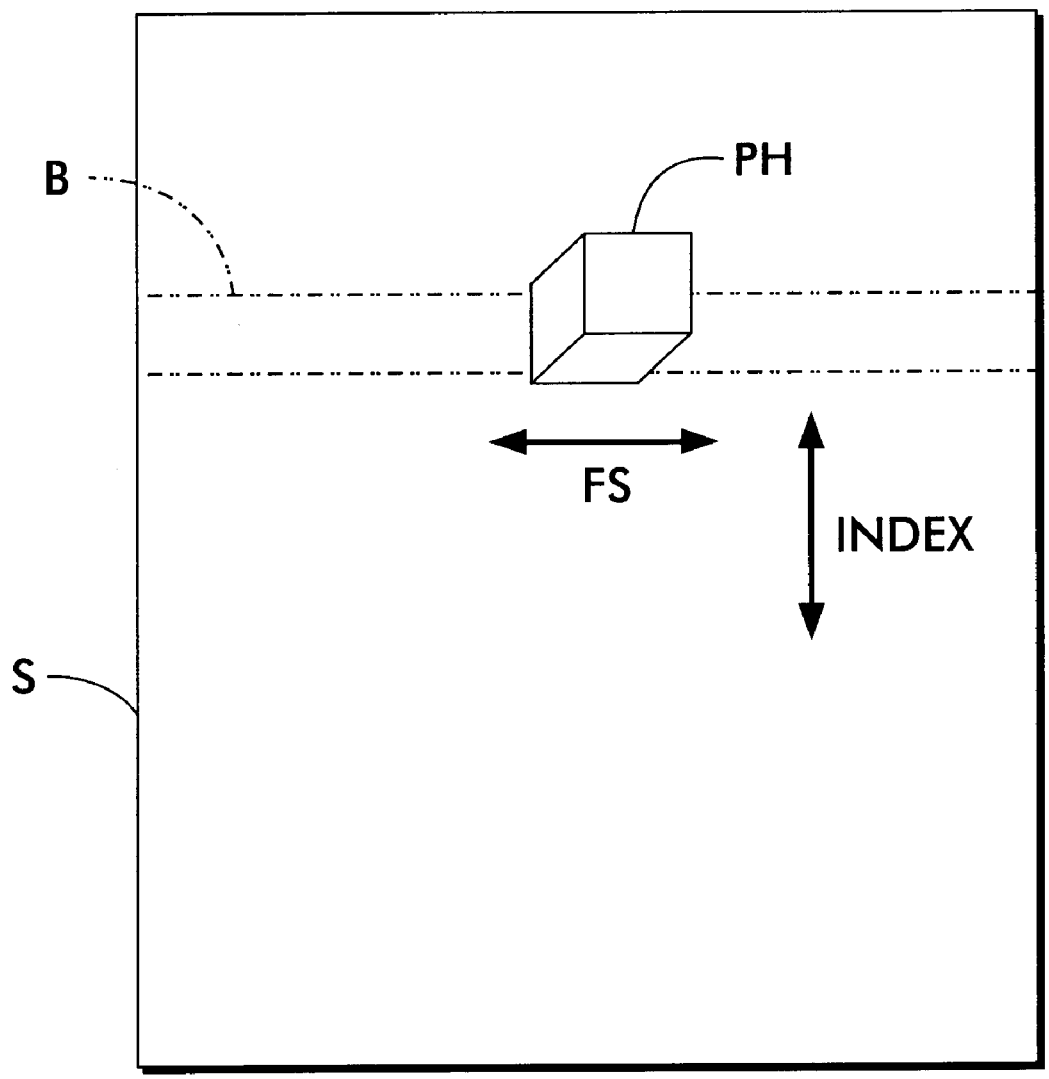
FIG. 1 is a diagram showing the general operation of a printhead, such as an ink-jet printhead, relative to a sheet, as is familiar in the prior art.

In the top set of original image data, there is shown a line of pixels as would correspond to a line of pixels in an image arranged parallel to the fast scan direction FS in FIG. 1; those square pixels marked with an X indicate those pixels which are intended to be "print-black" pixels in the image to be printed. (Of course, although only the monochrome embodiment of the present invention is here illustrated, the system of the present invention can readily be incorporated with regard to different color separations in a full-color system, or to a printing apparatus capable of creating pixel-sized marks of a predetermined grayscale value besides pure black or white.) In the present invention, the input data is the original image data that would be output to a digital printer, if the digital printer had the same output resolution as the original resolution. This is significant because the overall system according to the present invention can be essentially considered an "add on" to a preexisting printing system; also, the input to the system of the present invention can be original image data on which an error diffusion algorithm has already been applied. In other words, the system of the present invention can be seamlessly combined with other image-enhancement systems such as error diffusion.

In the second line of pixels in FIG. 2, as labeled, there is a series of pixels arranged whereby the resolution of the output image data is N×2N, whereas the original data, as shown, is N×N. In other words, in the N×2N output, the resolution has been doubled in the fast scan direction, and thus, for each square-shaped pixel in the original image data, there is a corresponding pair of subpixels, subpixels being arranged side-by-side so that, as recited in the claims, the subpixel areas for each pixel are arranged in positions to reflect a relationship of the original resolution to the output resolution.

Comparing the N×N original image data with the N×2N output data, the following will be noticed. First, every N×N print black pixel corresponds to a pair of subpixels in the N×2N output data. The side-by-side subpixels corresponding to each pixel in the original image reflects the doubling of resolution along the fast-scan direction FS. For each print-black pixel in the original image data, one of the pair of subpixels is assigned a 1 (meaning the ejector should place a droplet of ink there) and a 0 (meaning the ejector should not place a droplet of ink in that subpixel area). It will further be noticed, for a series of print-black pixels across the fast-scan direction FS, the placement of the droplet of ink strictly alternates, so that successive printblack pixels along the line correspond to 10, 01, 10, 01, etc., placement of subpixels as will be described in detail below, another dimension to the placement of droplets in subpixel areas is the fact that different pixels are placed in different multiple passes of the ink-jet printhead.

The third line of subpixel areas shown in FIG. 2, as labeled, demonstrates the placement of spots in a digital printing system wherein the output resolution is doubled in both dimensions relative to the original image data to 2N×2N, such as would occur if 300×300 spi original image data is submitted to a 600×600 spi printer. The increase in resolution in the index direction perpendicular to the fast-scan direction FS is carried out in an ink-jet printing apparatus, by providing two ink ejectors side-by-side corresponding to the two rows of subpixel areas in the output data. In this case, for each N×N resolution pixel in the original image data, there results four subpixels arranged in quadrants as shown, once again reflecting a relationship of the original resolution to the output resolution, being here doubled in both dimensions.

As shown, the number 1 among each set of four subpixels corresponding to each print-black pixel in the original image, rotates its position in a clockwise manner. Although this strict clockwise rotation of the subpixel area receiving the ink droplet is shown, it is also conceivable to have the selected subpixel area for each of a series of print-black pixels to be selected randomly, or according to a predetermined repeating sequence, as shown.

In either the N×2N or 2N×2N cases shown, the important point is that the particular subpixel area receiving the ink droplet is distributed among subpixel areas substantially evenly over a set of print-black pixels; in other words, at least in a long run, every subpixel area position receives an approximately equal proportion of the ink droplets over a large set of printblack pixels.

Figure 3:
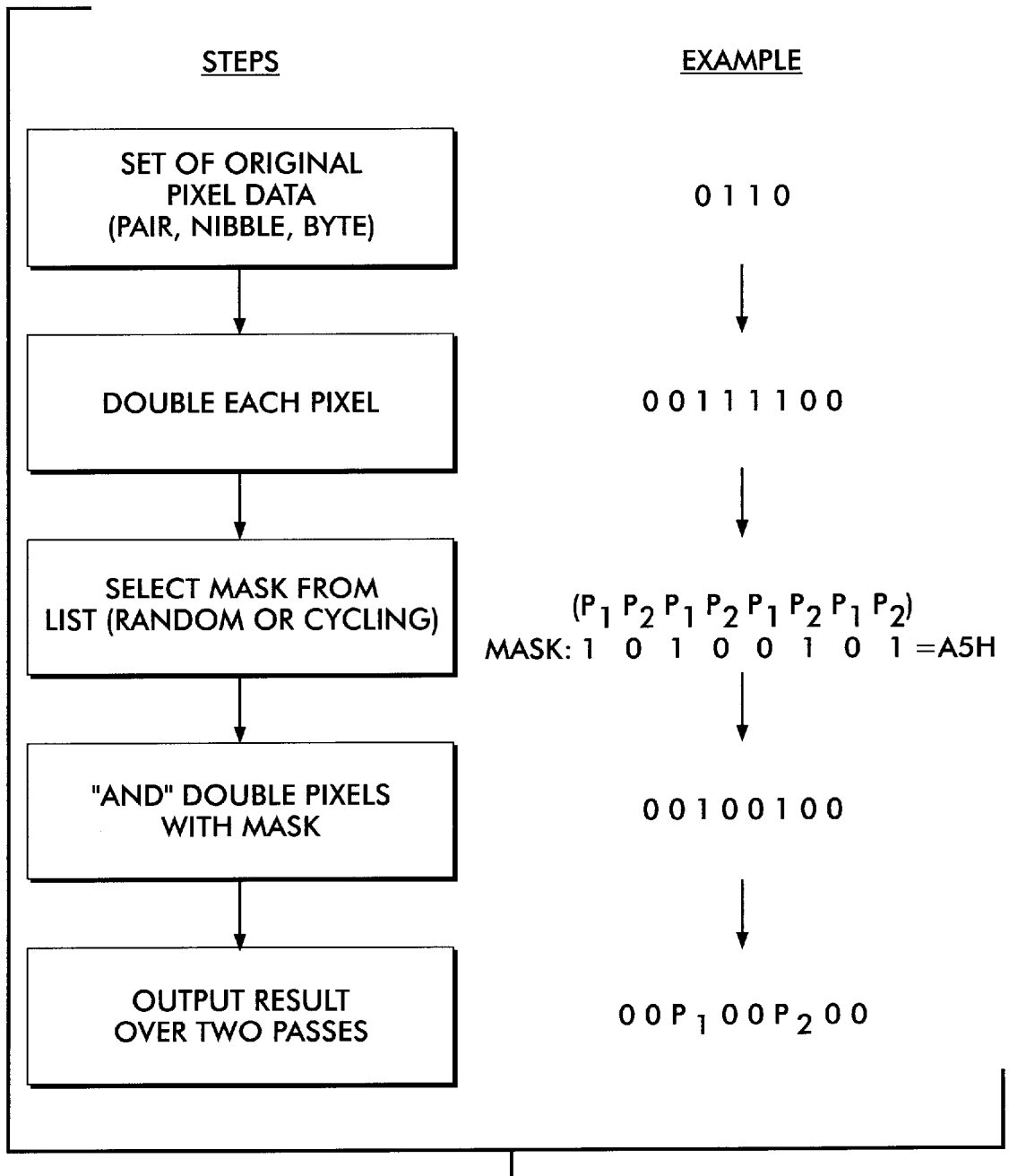
FIG. 3 is a flow-chart of a preferred method of controlling a printing apparatus to operate according to the present invention.

FIG. 3 is a flow chart, along with an accompanying example on the right-hand side thereof, illustrating one implementation of the present invention. The implementation of FIG. 3 is applicable to the N×2N conversion such as shown in the middle line of FIG. 2. Starting at the top of FIG. 3, a set of original pixel data, such as data corresponding to four pixels as shown, is processed by the algorithm. Although four pixels (a "nibble") of pixels is shown being processed, other amounts of original image data, such as a pair of pixels, a byte of pixels, or even an entire line of pixels, can be processed at once. In the example shown on the right hand side, the original data being processed is 0110 (0 being a print-white pixel, 1 being a printblack pixel).

The first step of processing is to double each pixel in the set, so that the original pixel set of 0110 is doubled on a bit-by-bit basis, and becomes a byte, 00111100. Next this doubled pixel data is filtered through a mask, by which is meant the byte of doubled pixel data is ANDed with another byte, the 1s and 0s of the mask byte being used to ensure that, when the original four pixels are spread among eight subpixels, only one subpixel corresponding to each printblack pixel causes a droplet to be ejected by the printhead. The nature and selection of the mask pixels will be described in detail below. Once the set of doubled pixels are ANDed with the mask byte, they will result a sequence of subpixel data which corresponds to desired configuration of subpixels in the N×2N output data shown in FIG. 2. Following the example of FIG. 3, the original image data of 0110 is thus converted into the subpixels 00100100: in other words, the original 0 pixel corresponds to two white subpixels 00, while the first 1 original pixel becomes 10, and the second original 1 pixel becomes 01 subpixels, etc.

The mask pixel can also be used as a mechanism by which it is decided whether to print a particular subpixel in the first pass of a two-pass system or the second pass. As seen over the mask byte in FIG. 3, the positions of the binary digits in the mask byte correspond to an alternating set of pass assignments, $P_1$ meaning that the pixel in that position should be printed on the first pass, while $P_2$ indicating that the corresponding pixel should be printed on the second pass. Thus, as shown in the final result of FIG. 3, the first printed subpixel should be printed on first pass $P_1$, while the second printed subpixel in the sequence should be printed on the second pass $P_2$. The first instance of a drop is printed in one pass while the second instance of a drop is printed on the second.

Returning to the subject of the "mask byte" alluded to above, preferably this mask byte, through which the doubled pixels are ANDed, is chosen over a series of pixels being processed, to ensure that the location of spots in subpixel positions is evenly distributed among a set of pixels. In regard to the FIG. 3 example, this set of suitable mask bytes can be described as a set of hexadecimal numbers. In this particular case, those hexadecimal numbers are: 55, 95, 65, A5, 59, 99, 69, A9, 56, 96, 66, A6, 5A, 9A, 6A, and M. Basically, the binary numbers resulting from these hexadecimal numbers will ensure that there will be no more than one ink droplet placed in every set of subpixels corresponding to an original image data pixel. For the case of converting from N×N to N×2N, the initial mask for a given line of input data can be alternated or chosen randomly. Thereafter the mask will be chosen based on the input data to alternate drops printed from corresponding parts of the byte. If the number of subpixels is greater than two there is greater flexibility in sequencing the masks. The portion of the mask corresponding to a pixel can be strictly alternated through a particular sequence or chosen randomly from the possible values.

While there has been described a one-byte mask, the actual size could be chosen to be some other size as long as it is at least the size of the region of sub-pixels corresponding to one input pixel. Much larger masks are not desired, as they reduce the capability to strictly alternate drops between passes and particularly within small regions.

With respect to the claims below, what is occurring in the steps of FIG. 3 is that each pixel datum in the original image data is what is here called "replicated" a certain number of times, the number of times being a function of how many subpixels the original pixel datum is assigned to. Thus, in the example of FIG. 3, where each pixel datum is assigned to two subpixels, each pixel datum, 0 or 1, is doubled, so that 0110 becomes 00111100. If the original pixel data were assigned to four subpixels each, the replication would have to be four times, so that the original pixel data 0110 would become 0000111111110000. Only after this replication step can the replicated pixel datum be ANDed with a suitable mask number to achieve the desired object of the present invention. (In the FIG. 3 example, the mask number is called a "mask byte" because, coincidentally, the mask number is an eight-digit binary number, or in other words a byte.)

It would be desirable to break this pattern of alternating drops only in the case of high frequency edge information in the image. Here the printing of a drop at one of the sub-pixel positions can be used to improve the edge response of the printing system. In such cases either the pattern for alternating masks can be reset according to the position of the printed subpixel, or the pattern could continue as if the subpixel were printed in the originally chosen location. The later is useful where the two steps, choosing high resolution edge positions and pixel assignments, are done in two independent processing steps.

While there has been described the invention for one ink droplet printed within the region associated with the particular input pixel, the invention can equally be extended to multiple drops per pixel, where one or more drops are printed among the associated subpixels.

Among the advantages of the system of subpixel spot placement according to the present invention, and particularly in regard to certain preferred embodiments thereof, is that it provides a simple technique for overcoming many practical problems associated particularly with low-end ink-jet printing apparatus. For instance, using multi-pass printing helps hide "head signature" (consistent misplacement of ink from a particular ejector in the printhead) and motion accuracy errors in drop placement. Further, the system of the present invention is useful in avoiding the appearance of "worms" in the printed image, which are perceptible patterns of agglomerated print spots forming small curved lines in locations where error-diffusion half-toning techniques are used, particularly in an asymmetric raster. Another problem addressed by the present invention is avoiding problems which occur when multiple passes approach the natural limit of the amount of ink which can be held by a given media such as paper; by reasonably distributing the location of subpixel droplets over successive passes, the media is given extra time to absorb ink before the next pass. Finally, the system of the present invention can be realized with no significant increase in processing time.

We claim:

1. A method of printing digital image data with a digital printer, the image data having print-black and print-white pixels arranged in an original resolution, the digital printer being capable of outputting an output image having an output resolution that is higher in at least one dimension than the original resolution, comprising the steps of:

for each print-black pixel in the image data, associating the pixel with a set of subpixel areas, the subpixel areas for each pixel being arranged in positions to reflect a relationship of the original resolution to the output resolution;

for each print-black pixel in the image data, assigning a print-black datum to a subpixel area; and distributing locations of print-black data among subpixel areas whereby, for a set of print-black pixels, the positions of the print-black data are substantially evenly distributed among positions of subpixel areas.

2. The method of claim 1, the distributing step including the step of rotating the position of the subpixel area being assigned the print-black datum for a series of print-black pixels along one dimension of the output image.

3. The method of claim 1, the distributing step including the step of randomly selecting the position of the subpixel area being assigned the print-black datum for a series of print-black pixels along one dimension of the output image.

4. The method of claim 1, the distributing step including the steps of:

replicating each pixel datum in the original image data;

ANDing the replicated pixel datum with a mask number; and assigning locations of subpixels for each pixel datum based on a result of the ANDing step.

5. The method of claim 4, wherein the mask number is selected randomly from a set of mask numbers.

6. The method of claim 4, wherein the mask number is selected by cycling through a set of mask numbers.

7. The method of claim 1, further comprising the steps of:

printing an image based on the image data in a first printing step and a second printing step; and wherein, for a line of print-black pixels along a scan direction in the image, printing a first subset of pixels in the first printing step and printing a second subset of pixels in the second printing step.

* * * * *